Nov. 5, 1968

C. W. HATCHER ET AL 3,409,330

TANDEM PAVEMENT SURFACING MACHINE

Filed Aug. 24, 1966

INVENTORS.
CECIL W. HATCHER,
HAROLD C. MILLER,
MICHAEL V. METZGER,
GLEN E. SIMMS,
By their Attorneys
HARRIS, KIECH, RUSSELL & KERN

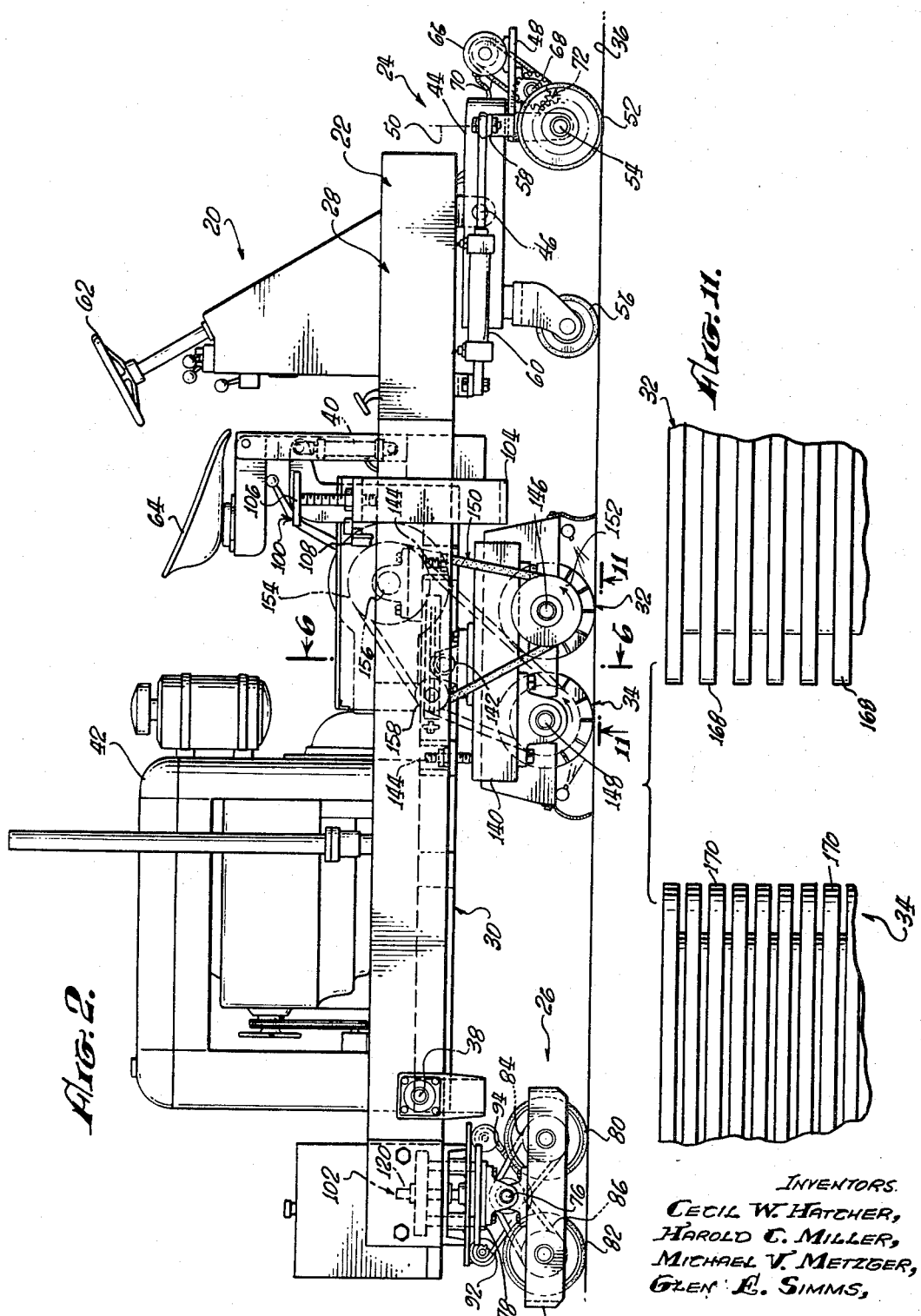

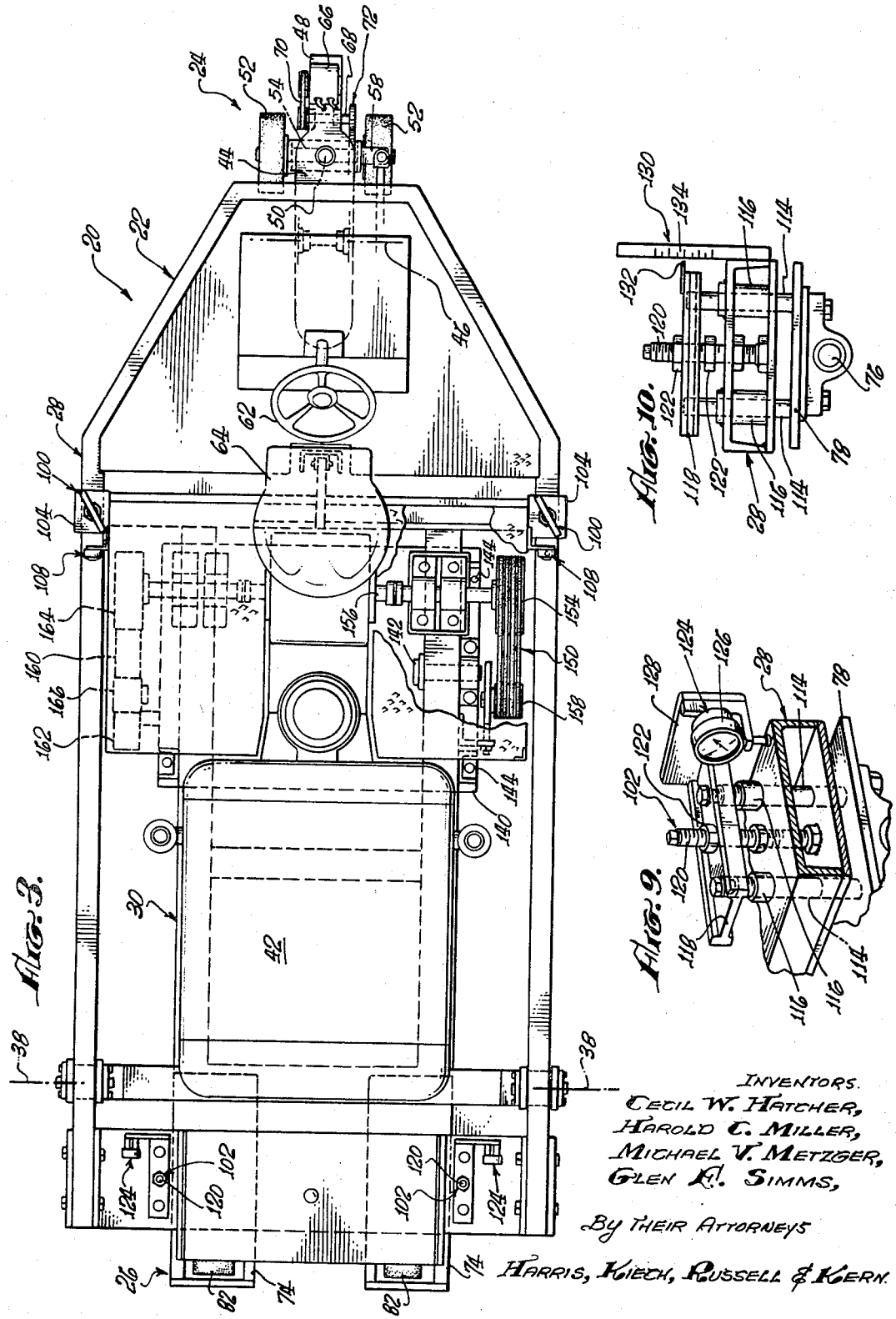

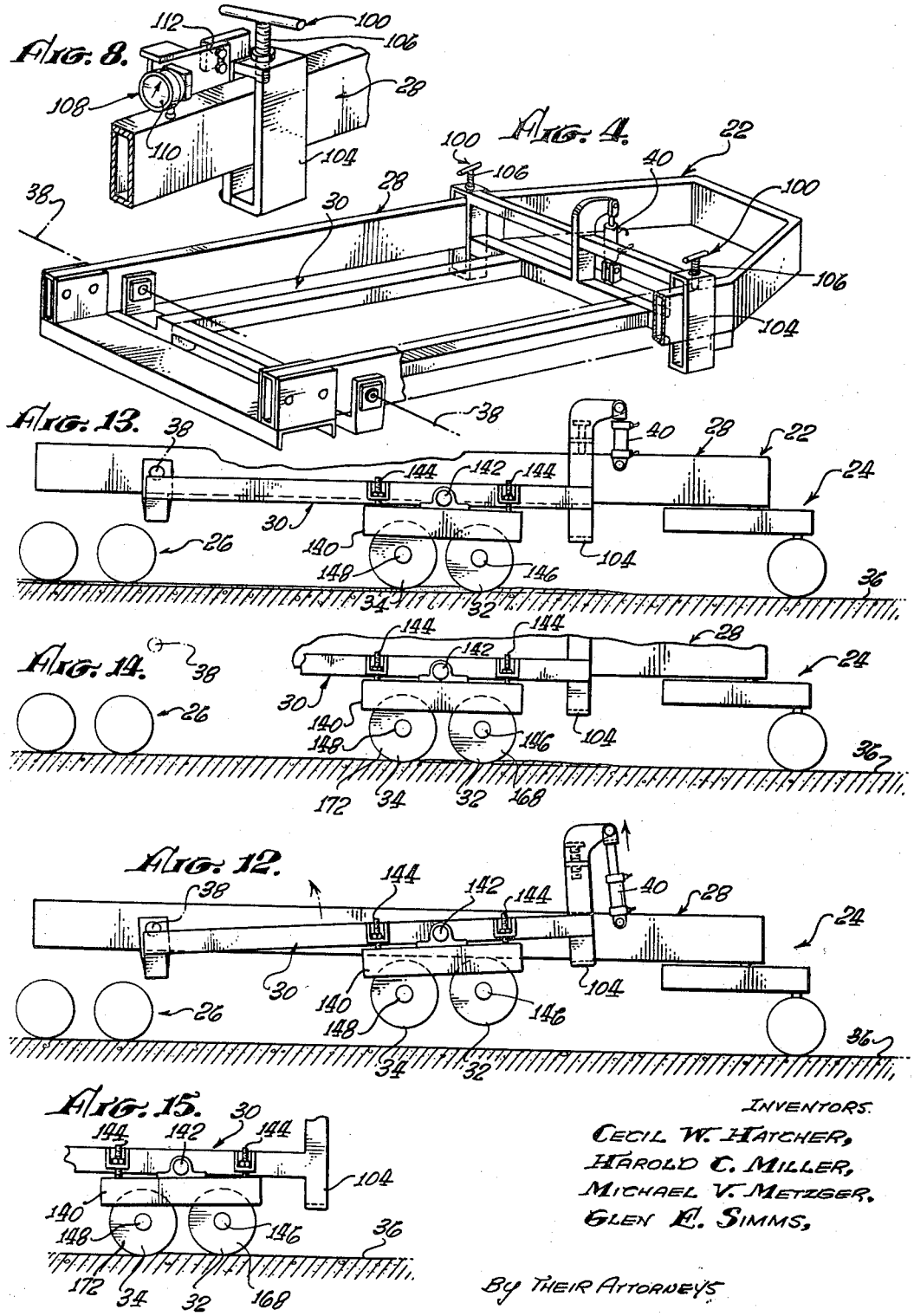

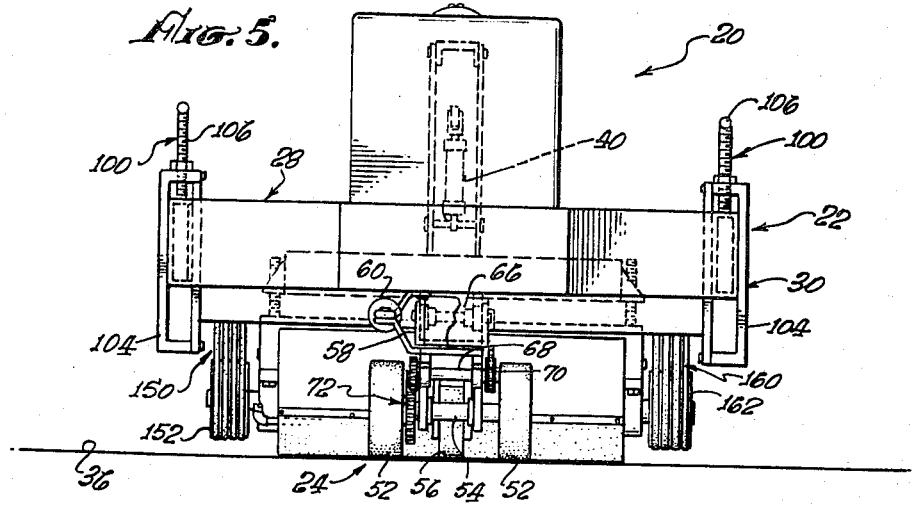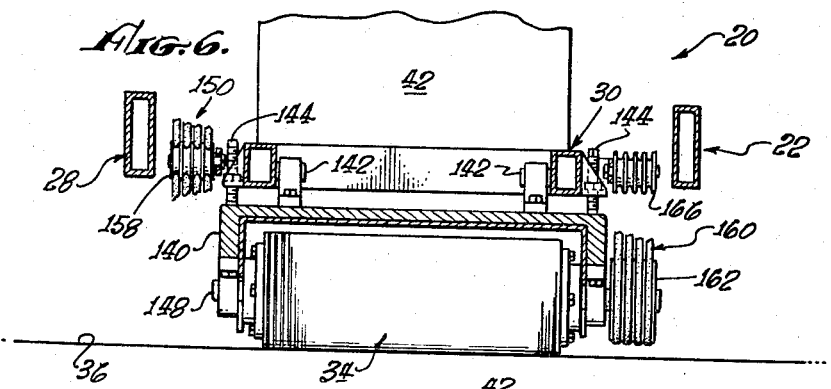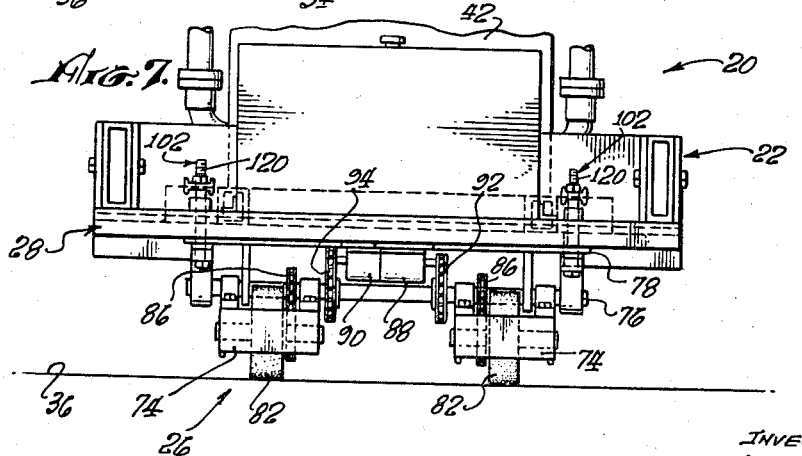

United States Patent Office 3,409,330
Patented Nov. 5, 1968

3,409,330
TANDEM PAVEMENT SURFACING MACHINE
Cecil W. Hatcher, West Covina, Calif., Harold C. Miller, Chicago, and Michael V. Metzger, Highland Park, Ill., and Glen E. Simms, Glendora, Calif., assignors to Concut, Inc., El Monte, Calif., a corporation of California
Filed Aug. 24, 1966, Ser. No. 574,719
10 Claims. (Cl. 299—39)

ABSTRACT OF THE DISCLOSURE

A wheeled pavement surfacing machine having two rotary cutter assemblies in tandem between the front and rear wheels of the machine. The relative vertical positions of the front and rear rotary cutter assemblies are adjustable. The front rotary cutter assembly includes laterally-spaced front rotary cutters which are relatively widely spaced, and the rear rotary cutter assembly includes laterally-spaced rear rotary cutters which are relatively narrowly spaced.

Background of invention

The present invention relates in general to a machine for surfacing, or, more accurately, resurfacing, pavement, and especially concrete pavement.

More particularly, the invention relates to a self-propelled, vehicle-type pavement surfacing machine of the type disclosed in Patents Nos. 3,195,957, issued July 20, 1965, Re. 25,838, reissued Aug. 10, 1965, 3,201,173, issued Aug. 17, 1965, 3,208,796, issued Sept. 28, 1965, and 3,272,560, issued Sept. 13, 1966, all to Cecil W. Hatcher, one of the applicants herein.

As background, the invention contemplates a self-propelled, vehicle-type, pavement surfacing machine of the type which includes: frame means having longitudinally spaced front and rear ends; front wheels means connected to and supporting the frame means adjacent the front end thereof; rear wheel means connected to and supporting the frame means adjacent the rear end thereof; rotary surfacing means carried by the frame means between the front and rear wheel means, and rotatable about a transverse axis of rotation, for performing a surfacing operation on pavement over which the machine runs; and means connected to the rotary surfacing means and at least one of the wheel means for driving the surfacing means and for propelling the machine.

Summary and objects of invention

The primary object of the present invention is to provide a pavement surfacing machine of the foregoing type having two rotary surfacing means in tandem between the front and rear wheel means and respectively rotatable about longitudinally-spaced front and rear transverse axes. A related and important object of the invention is to provide the machine with means for adjusting the relative vertical positions of the front and rear rotary surfacing means.

With the foregoing construction, by utilizing front and rear rotary surfacing means having various different characteristics and/or by varying the relative depths of cut of the front and rear rotary surfacing means, a wide variety of surfacing operations may be performed, such as removing bumps to level the pavement, grooving the pavement to increase its skid resistance, providing the pavement with a smooth, level surface, and the like, which are important features of the invention. Another important feature is that the invention in many instances materially reduces the total power required for a given surfacing operation by dividing the surfacing operation between the front and rear rotary surfacing means, as compared to a machine having but a single rotary surfacing means.

Another object of the invention is to provide a pavement surfacing machine of the foregoing character wherein the front rotary surfacing means includes laterally-spaced front rotary cutters which are relatively widely spaced, and wherein the rear rotary surfacing means either includes laterally-spaced rear rotary cutters which are relatively narrowly spaced, or comprises a surfacing drum for producing a substantially smooth surface.

A further object of the invention is to provide a tandem machine of the foregoing nature wherein the front and rear rotary surfacing means are carried by a supporting means mounted on the frame means for pivotal movement about a transverse supporting-means pivot axis longitudinally intermediate the front and rear rotary surfacing means, and wherein the angular position of the supporting means is varied by an adjustment means interconnecting the frame means and the supporting means so as to vary the relative vertical positions of the front and rear rotary surfacing means, and thus the relative depths of cut thereof.

An additional object of the invention is to provide a pavement surfacing machine of the foregoing nature wherein the front wheel means includes a front truck which is pivotable relative to the front end of the frame means about a transverse front-truck pivot axis and which includes tandem front wheels, this construction minimizing the reflection to the rotary surfacing means of bumps encountered by the front wheel means. A related object is to provide a machine wherein the rear wheel means includes laterally spaced rear trucks which are independently pivotable relative to the rear end of the frame means about a transverse rear-truck pivot axis and each of which includes tandem rear wheels, whereby to minimize reflections of bumps encountered by the rear wheel means to the rotary surfacing means.

Yet another object of the invention is to provide a pavement surfacing machine including: a main frame constituting part of the frame means, and having longitudinally spaced front and rear ends to which the front and rear wheel means are connected respectively; an auxiliary frame constituting part of the frame means, and having a front end carrying said supporting means for the front and rear rotary surfacing means, and having a rear end connected to the rear end of the main frame for pivotal movement of the auxiliary frame relative to the main frame about a transverse auxiliary-frame pivot axis; and means interconnecting the front end of the auxiliary frame and the main frame for pivoting the auxiliary frame upwardly and downwardly relative to the main frame, about the transverese auxiliary-frame pivot axis, so as to raise and lower the supporting means for the front and rear rotary surfacing means. A related object is to provide a machine wherein the means for driving the two rotary surfacing means and for propelling the machine includes engine means mounted on the auxiliary frame. Another related obect is to provide a machine of this nature wherein the auxiliary frame is disposed within the main frame.

Still another object of the invention is to provide a pavement surfacing machine including: laterally spaced, independent adjustable means for independently limiting downward movement of opposite sides of the front end of the auxiliary frame relative to the main frame; laterally spaced indicator means for indicating the vertical positions of the opposite sides of the front and of the auxiliary frame relative to the main frame; laterally spaced, independent adjustable means for independently vertically adjusting opposite sides of the rear end of the main frame relative to the rear wheel means; and laterally spaced indicator means for indicating the vertical positions of the opposite sides of the rear end of the main frame relative to the rear wheel means. With the foregoing construction, the pavement surfacing machine may be adjusted to provide a lateral inclination of the final pavement surface which is the same as or different from the lateral inclination of the original pavement surface.

The foregoing objects, advantages, features and results of the present invention, together with various other objects, advantages, features and results thereof which will be evident to those skilled in the pavement surfacing art in the light of this disclosure, may be achieved with the exemplary embodiments of the invention described in detail hereinafter and illustrated in the accompanying drawings.

Description of drawings

In the drawings:

FIG. 2 is a side elevational view of the machine taken from the right side thereof;

FIG. 3 is a plan view of the machine;

FIG. 4 is a perspective view showing pivotally interconnected main and auxiliary frames constituting a frame means of the machine;

FIG. 5 is a front view of the machine;

FIG. 6 is a transverse sectional view through the machine which is taken as indicated by the arrowed line 6—6 of FIG. 2;

FIG. 7 is a rear view of the machine;

FIG. 8 is a fragmentary perspective view showing an adjustable means for limiting downward movement of one side of the front end of the auxiliary frame relative to the main frame;

FIG. 9 is fragmentary perspective view of an adjustable means for vertically adjusting one side of the rear end of the main frame relative to a rear wheel means of the machine;

FIG. 10 is a fragmentary sectional view similar to FIG. 9, but illustrating an alternative structure;

FIG. 11 is an enlarged, fragmentary, bottom plan view of one embodiment of tandem rotary surfacing means of the machine of the invention, and is taken as indicated by the arrowed line 11—11 of FIG. 2; and FIGS. 12 to 15 are fragmentary, semi-diagrammatic, side elevational views of the machine showing various operating modes, FIG. 12 showing the machine with the tandem rotary surfacing means raised clear of the pavement for transport purposes and FIGS. 13 to 15 illustrating various surfacing operations which can be performed with the tandem rotary surfacing means and/or illustrating different embodiments of the tandem rotary surfacing means.

Description of exemplary embodiments of invention

Figure 1:
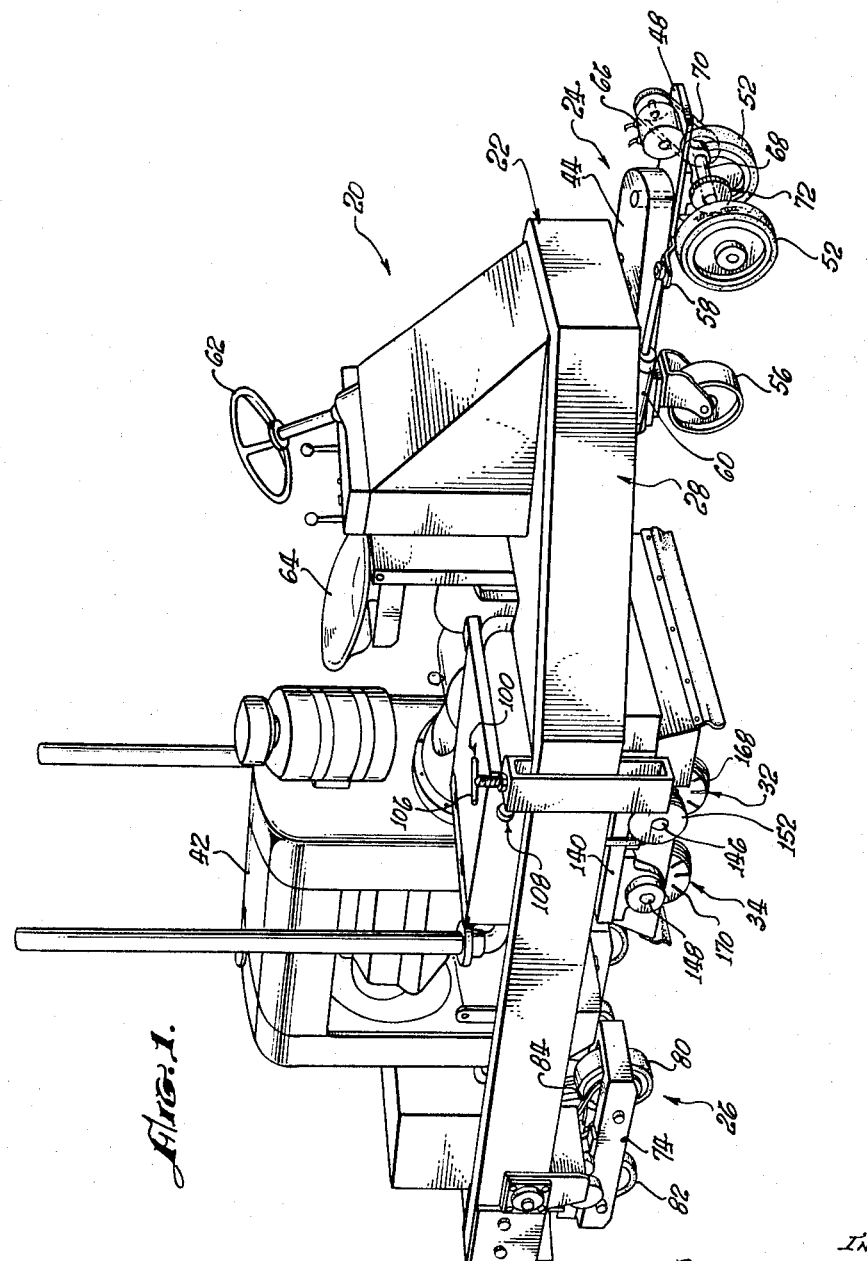
FIG. 1 is a perspective view of a tandem pavement surfacing machine which embodies the invention.

Referring particularly to FIGS. 1 to 4 of the drawings, the self-propelled, vehicle-type, tandem pavement surfacing machine of the invention is designated generally therein by the numeral 20 and includes a frame means 22 supported at its front and rear ends by front and rear wheel means 24 and 26, respectively.

The frame means 22 includes an open main frame 28 to which the front and rear wheel means 24 and 26 are connected in a manner to be described. Within and encompassed by the main frame 28 is an auxiliary frame 30 which, as best shown in FIG. 4, is disposed in substantially the same horizontal plane as the main frame.

The auxiliary frame 30 carries tandem, front and rear, rotary, pavement surfacing means 32 and 34 for performing various surfacing operations on pavement 36 over which the machine 20 runs. The front and rear rotary surfacing means 32 and 34 are rotatable about front and rear, transverse axes of rotation and are mounted on the auxiliary frame 30 in a manner to be described.

As best shown in FIG. 4, the auxiliary frame 30 is pivotally connected at its rearward end to the main frame 30, adjacent the rearward end of the main frame, by suitable pivot means providing a transverse auxiliary-frame pivot axis 38. With this construction, the two rotary surfacing means 32 and 34, which are mounted on the auxiliary frame 30 adjacent the front end thereof, can be lowered into and raised out of surfacing engagement with the pavement 36 by pivoting the front end of the auxiliary frame upwardly and downwardly about the pivot axis 38, the raised position being shown in FIG. 12. For this purpose, the machine 20 is provided with means, preferably a double-acting hydraulic cylinder 40, interconnecting the front end of the auxiliary frame 30 and the main frame 28 for pivoting the front end of the auxiliary frame upwardly and downwardly relative to the main frame about the pivot axis 38. Also, the hydraulic cylinder 40 may be utilized as a snubber to maintain the rotary surfacing means 32 and 34 in surfacing engagement with the pavement 36.

The machine 20 includes a suitable power source, which preferably comprises an internal combustion engine 42 mounted on the auxiliary frame 30 so that part of its weight is applied directly to the surfacing means 32 and 34 to maintain them in surfacing engagement with the pavement 36. Additional weight can be applied to the surfacing means 32 and 34 by energizing the hydraulic cylinder 40 in a direction to act downwardly on the front end of the auxiliary frame 30, thereby providing the snubbing action hereinbefore mentioned. The hydraulic cylinder 40, which is a double-acting cylinder, is powered by hydraulic fluid supplied by a suitable pump, not shown, driven by the engine 42.

Considering the front wheel means 24 in more detail, it includes a front truck 44 mounted on the front end of the main frame 28 for pivotal movement relative thereto about a transverse front-truck pivot axis 46, FIGS. 2 and 3. At the front end of the front truck 44 is a front-wheel carriage 48 pivotable relative to the front truck about a vertical pivot axis 50. The front-wheel carriage 48 has laterally-spaced front wheels 52 mounted thereon and interconnected by a rotatable shaft 54. The rear end of the front truck 44 has a rear, caster wheel 56 mounted thereon.

With the foregoing construction, the front truck 44 can pivot about its axis 46 as the front and rear wheels 52 and 56 thereon encounter bumps in the pavement 36, thereby minimizing reflections of such bumps to the rotary surfacing means 32 and 34. If greater minimization of bump reflections from the front wheel means 24 to the rotary surfacing means 32 and 34 is desired, the main frame 28 can be lengthened to locate the front wheel means 24 a greater distance from the rotary surfacing means 32 and 34 than the rear wheel means 26, as disclosed in the aforementioned Patent No. Re. 25,838.

The pivoted front-wheel carriage 48 on the front truck 44 serves as a means for steering the pavement surfacing machine 20. More particularly, the front-wheel carriage 48 is provided with a steering arm 58 to which a double-acting steering cylinder 60 is connected, this steering cylinder being anchored to the main frame 28, as best shown in FIG. 2. The steering cylinder 60 may be powered by hydraulic fluid supplied by the hereinbefore-mentioned hydraulic pump driven by the engine 42, and may be controlled by a steering wheel 62 mounted on the front end of the main frame ahead of an operator's seat 64 thereon.

When the pavement surfacing machine 20 is being propelled forwardly, part of the propulsive force is provided by a rotary hydraulic motor 66 which is supplied with hydraulic fluid by the engine-driven hydraulic pump hereinbefore mentioned, and which drives the front wheels 52 on the front truck 44. More particularly, the rotary hydraulic motor 66 is mounted on the front-wheel carriage 48 of the front truck 44 and drives a countershaft 68 on such carriage through a belt 70. Rotation of the countershaft 68 is transmitted to the front-wheel shaft 54 by suitable gearing 72.

Considering the rear wheel means 26, it includes two laterally spaced rear-truck frames 74, FIGS. 2 and 7, independently pivotable on a transverse rear-truck shaft 76 carried by a rear-truck support 78 which is adjustably mounted on the rear end of the main frame 28 in a manner to be described hereinafter. Each rear-truck frame 74 carries tandem rear-truck wheels 80 and 82 suitably rotatably mounted thereon.

With the foregoing construction, the rear-truck frames 74 can pivot independently of each other, about the transverse rear-truck pivot axis provided by the rear-truck shaft 76, to minimize reflections to the rotary surfacing means 32 and 34 of any residual bumps encountered by the rear-truck wheels 80 and 82. It will be understood that any such residual bumps will be small since the rear-truck wheels 80 and 82 preferably run on a path leveled by the rotary surfacing means 32 and 34, the tread of the rear-truck wheels 80 and 82 being less than the width of the rotary surfacing means 32 and 34 to achieve this.

As best shown in FIGS. 2 and 7, the rear-truck shaft 76, in addition to serving as a pivot shaft for the rear-truck frames 74, also serve as a drive shaft for the rear-truck wheels 80 and 82. More particularly, the rear-truck wheels 80 and 82 are respectively connected to the rear-truck shaft 76 by drive chains 84 and 86, respectively. Carried by the rear-truck support 78 are rotary, hydraulic, forward and reverse drive motors 88 and 90 respectively connected to the rear-truck shaft 76 by drive chains 92 and 94. It will be understood that the forward propulsive force provided by the forward drive motor 88 is supplemented by the forward drive motor 66 hereinbefore described, these motors acting in concert to overcome the forward resistance to movement provided by the hereinafter described rotary surfacing means 32 and 34. When operating the machine 20 in reverse, only the reverse drive motor 90 is necessary.

As in the case of the elevating and snubbing cylinder 40, the steering cylinder 60 and the drive motor 66, the drive motors 88 and 90 are also supplied with hydraulic fluid from the hereinbefore-discussed engine-driven hydraulic pump. It will be understood that the necessary controls for these components, as well as for other components to be described, may be provided in locations readily accessible from the operator's seat 64.

The pavement surfacing machine 20 incorporates provisions for varying the lateral orientations of the rotary surfacing means 32 and 34 about the longitudinal axis of the machine, thus permitting the achievement of a final pavement surface laterally parallel to, or laterally inclined in either direction relative to, the original pavement, as desired. More particularly, to achieve this, the pavement surfacing machine 20 includes laterally spaced, independent adjustable means 100 for independently limiting downward movement of opposite sides of the front end of the auxiliary frame 30 relative to the main frame 28, and includes laterally spaced, independent adjustable means 102 for independently vertically adjusting opposite sides of the rear end of the main frame relative to the rear-truck support 78.

Referring to FIG. 4 of the drawings, the front end of the auxiliary frame 30 is provided on opposite sides thereof with rectangular guide frames 104 through which the respective sides or side rails of the main frame 28 extend. The rectangular guide frames 104 are vertically elongated to provide for sufficient upward and downward movement of the front end of the auxiliary frame 30 to permit the rotary surfacing means 32 and 34 to be lifted clear of the pavement 36, FIG. 12, and to be lowered into surfacing engagement therewith. Each adjustable means 100 simply comprises an adjusting screw 106 threaded downwardly through the corresponding guide frame 104 and engageable with the upper surface of the corresponding side rail of the main frame 28. By independently adjusting the screws 106, the limits of downward movement of the opposite sides of the front end of the auxiliary frame 30 may be independently adjusted.

Referring to FIG. 8, associated with each adjustable means 100 is an indicator means 108 for indicating the vertical position of the corresponding side of the front end of the auxiliary frame 30 relative to the corresponding side of the main frame 28. More particularly, each indicator means 108 is shown as comprising a plunger-actuated, dial-type indicator 110 which is carried by a bracket 112 mounted on the corresponding guide frame 104 and the plunger of which is engageable with the upper surface of the corresponding side of the main frame 28.

Considering the adjustable means 102 in more detail, and referring particularly to FIG. 9 of the drawings, the rear-truck support 78 has fixedly connected thereto at each side of the main frame 28 two vertical rods 114 which extend upwardly through guides 116 on the main frame. The upper ends of the rods 114 have a member 118 fixedly connected thereto, A vertical adjusting screw 120 is fixedly connected to the corresponding portion of the main frame 28 and projects upwardly through the member 118, being equipped with lock nuts 122 above and below the member 118. As will be apparent, by independently adjusting the lock nuts 122 on the two adjusting screws 120, opposite sides of the rear end of the main frame 28 may be independently vertically adjusted relative to the rear-truck support 78.

The vertical positions of the opposite sides of the rear end of the main frame 28 relative to the rear-truck support 78 are indicated by corresponding indicator means 124. Each indicator means 124 is shown as including a plunger-actuated, dial-type indicator 126 which is carried by a bracket 128 on the corresponding member 118 and the plunger of which engages the top of the corresponding portion of the main frame 28.

As will be apparent, by suitably independently adjusting the screws 106 and 120, the rotary surfacing means 32 and 34 may be caused to assume any desired lateral inclination relative to the original pavement 36. In other words, the rotary surfacing means 32 and 34 may be laterally oriented parallel to the original pavement, or they may be laterally inclined relative thereto in either direction, as desired. As will be apparent, the indicators 110 and the indicators 126 are utilized in making the desired adjustments of the lateral orientation of the rotary surfacing means 32 and 34, which is an important feature.

FIG. 10 of the drawings shows an alternative indicator means 130 which may be utilized in place of the indicator means 124. The indicator means 130 is shown simply as comprising a pointer 132 which is mounted on the member 118 and which is movable relative to a scale 134 on the corresponding portion of the main frame 28. If desired, an indicator means, not shown, similar to the indicator means 130 may be substituted for the indicator means 108.

Considering the rotary surfacing means 32 and 34 in more detail, the machine 20 includes a surfacing-means support or supporting means 140 which, as best shown in FIGS. 2 and 6, is located beneath the auxiliary frame 30 adjacent the front end thereof and which is connected to the auxiliary frame by aligned pivot means 142 permitting pivotal movement of the support 140 about a transverse pivot axis. The angular position of the surfacing-means support 140 is adjusted by means of four adjusting screws 144 threadedly engaging the auxiliary frame 30 and bearing against the support 140. Two of the adjusting screws 144 are located on one side of the auxiliary frame 30 ahead of and behind the corresponding pivot means 142, and the other two adjusting screws are located on the other side of the auxiliary frame ahead and behind the corresponding pivot means. As will be apparent, by suitably setting the adjusting screws 144, the angular position of the surface-means support 140 relative to the auxiliary frame 30 can be varied about the transverse pivot axis provided by the pivot means 142. Such variations in the angular position of the surfacing means support 140 are utilized to vary the relative depths of cut of the two rotary surfacing means 32 and 34, as will be described hereinafter.

The front and rear rotary surfacing means 32 and 34 respectively include longitudinally spaced, transverse, front and rear shafts 146 and 148 mounted in suitable bearings on the surfacing-means support 140. As best shown in FIGS. 2 and 6, the front shaft 146 is driven by belts 150 trained around pulleys 152 on the shaft 146 and pulleys 154 on a transverse power takeoff shaft 156 rotatably mounted on the auxiliary frame 30 and suitably driven by the engine 42. The belts 150 are also trained over idler pulleys 158 mounted on the auxiliary frame 30 and adjustable in position to adjust the tensions in the belts 150.

Similarly, the rear shaft 148 is driven by belts 160 traned around pulleys 162 on the shaft 148 and pulleys 164 on the power takeoff shaft 156. The belts 160 are also trained around idler pulleys 166 carried by the auxiliary frame 30 and adjustable in position to adjust the tensions in the belts 160.

It will be understood that the tension adjustments provided by the idler pulleys 158 and 166 compensate for variations in the angular position of the surfacing-means support 140 relative to the auxiliary frame 30.

Preferably, both rotary surfacing means 32 and 34 are driven in the counterclockwise direction, as viewed from the right side of the machine 20, so that they abrade or cut upwardly against uncut portions of the pavement 36 ahead of them. In some instances, counter-rotating surfacing means 32 and 34 may be used so that the propulsive forces applied thereby to the machine 20 act in opposite directions, thereby reducing the power required of the forward propulsion motors 66 and 88. In such event, the front and rear rotary surfacing means 32 and 34 preferably rotate in the clockwise and counterclockwise directions, respectively, as viewed from the right side of the machine, so that the rear rotary surfacing means abrades or cuts upwardly in performing the final surfacing operation on the pavement 36.

The two rotary surfacing means 32 and 34 may have various constructions, depending on the type of surfacing operation to be performed. As an example, FIG. 11 shows the front rotary surfacing means 32 as comprising laterally-spaced, disc-type, rotary cutters 168 which are relatively widely spaced. In this case, the rear rotary surfacing means 34 is shown as comprising laterally-spaced, disc-type, rotary cutters 170 which are relatively narrowly spaced. The cutters 168 and 170 are provided with abrasive peripheries, as by bonding thereto diamond particles or diamond dust. Merely as an example, the cutters 168 and 170 may have a width of 0.125 inch with a spacing of 0.150 inch between the cutters 168 and a spacing of 0.030 inch between the cutters 170.

The rotary surfacing means 32 and 34 equipped with cutters 168 and 170 may be used in various ways. For example, the surfacing-means support 140 may be so adjusted that the depths of cut of the cutters 168 and 170 are the same. In this case, the widely-spaced cutters 168 make preliminary cuts and the narrowly-spaced cutters 170 make final cuts. The final pavement surface is grooved for increased skid resistance, as in highways or airport runways, and any bumps in the pavement 36 are leveled in the process. The preliminary grooving done by the front cutters 168 greatly reduces the power required for the final grooving done by the cutters 170, the total power being less than that which would be required if the complete surfacing operation were performed with a single set of cutters. This is an important advantage of the tandem surfacing means disclosed.

Referring to FIG. 13 for another example, the cutters 168 of the front rotary surfacing means 32 are shown as set to cut deeper than the cutters 170 of the rear rotary surfacing means 34, and are shown as removing a bump in the pavement 36 in the process. Alternatively, the rear cutters 170 may be set to cut deeper than the front cutters 168, one of these relative depth settings being desirable in some instances and the other in others.

FIGS. 14 and 15 show an arrangement wherein the rear rotary surfacing means 34 comprises a finishing drum for providing a substantially smooth finished surface, which is desirable in a concrete floor, for example. The finishing drum 172 may be a diamond studded drum or it may have a peripheral coating of diamond particles or dust bonded thereto. FIG. 14 shows the front rotary surfacing means 32 in operation ahead of the finishing drum 172 to perform a preliminary grooving operation so as to reduce the power required to operate the finishing drum. FIG. 15 shows the finishing drum 172 only in operation, the surfacing-means support 140 being adjusted to lift the front rotary surfacing means 32 just clear of the pavement being surfaced.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim as our invention:

1. In a pavement surfacing machine, the combination of:
    (a) frame means having longitudinally spaced front and rear ends;
    (b) front wheel means connected to and supporting said frame means adjacent said front end thereof;
    (c) rear wheel means connected to and supporting said frame means adjacent said rear end thereof;
    (d) front rotary surfacing means carried by said frame means between said front and rear wheel means, and rotatable about a front transverse axis of rotation, for surfacing pavement over which the machine runs;
    (e) rear rotary surfacing means carried by said frame means between said front rotary surfacing means and said rear wheel means, and rotatable about a rear transverse axis of rotation, for surfacing pavement over which the machine runs;
    (f) said front rotary surfacing means including laterally-spaced front rotary cutters and said rear rotary surfacing means including laterally-spaced rear rotary cutters having a different lateral spacing than said front rotary cutters;
    (g) means connected to said front and rear rotary surfacing means for driving said front and rear rotary surfacing means; and
    (h) means connected to at least one of said wheel means for propelling the machine.

2. A pavement surfacing machine according to claim 1 including means for adjusting the relative vertical positions of said front and rear rotary surfacing means.

3. A pavement surfacing machine including:
    (a) frame means having longitudinally spaced front and rear ends;
    (b) front wheel means connected to and supporting said frame means adjacent said front end thereof;
    (c) rear wheel means connected to and supporting said frame means adjacent said rear end thereof;
    (d) front rotary surfacing means between said front and rear wheel means, and rotatable about a front transverse axis of rotation, for surfacing pavement over which the machine runs;
    (e) rear rotary surfacing means between said front rotary surfacing means and said rear wheel means, and rotatable about a rear transverse axis of rotation, for surfacing pavement over which the machine runs;
(f) supporting means carrying said front and rear rotary surfacing means in longitudinally spaced relation;
(g) pivot means mounting said supporting means on said frame means for pivotal movement about a transverse supporting-means pivot axis longitudinally intermediate said front and rear transverse axes of rotation, so as to vary the relative vertical positions of said front and rear rotary surfacing means;
(h) adjustment means interconnecting said frame means and said supporting means for pivoting said supporting means relative to said frame means, about said transverse supporting-means pivot axis, so as to vary the relative vertical positions of said front and rear rotary surfacing means;
(i) means connected to said front and rear rotary surfacing means for driving said front and rear rotary surfacing means; and
(j) means connected to at least one of said wheel means for propelling the machine.

4. A pavement surfacing machine according to claim 3 including:
(a) a main frame constituting part of said frame means, and having longitudinally spaced front and rear ends to which said front and rear wheel means are connected, respectively;
(b) an auxiliary frame constituting part of said frame means, and having a front end carrying said supporting means for said front and rear rotary surfacing means, and having a rear end connected to said rear end of said main frame for pivotal movement of said auxiliary frame relative to said main frame about a transverse auxiliary-frame pivot axis; and
(c) means interconnecting said front end of said auxiliary frame and said main frame for pivoting said auxiliary frame upwardly and downwardly relative to said main frame, about said transverse auxiliary-frame pivot axis, so as to raise and lower said supporting means for said front and rear rotary surfacing means.

5. A pavement surfacing machine as defined in claim 4 wherein said means for driving said front and rear rotary surfacing means and for propelling the machine includes engine means mounted on said auxiliary frame.

6. A pavement surfacing machine as set forth in claim 5 wherein:
(a) said rear wheel means includes laterally spaced rear trucks independently pivotable relative to said rear end of said main frame about a transverse rear-truck pivot axis and each including tandem rear wheels; and
(b) said front wheel means includes a front truck pivotable relative to said front end of said main frame about a transverse front-truck pivot axis and including tandem front wheels.

7. In a pavement surfacing machine, the combination of:
(a) a main frame having longitudinally spaced front and rear ends;
(b) front wheel means connected to and supporting said main frame adjacent said front end thereof;
(c) rear wheel means connected to and supporting said main frame adjacent said rear end thereof;
(d) an auxiliary frame having a front end located intermediate said front and rear ends of said main frame and having a rear end located adjacent said rear end of said main frame;
(e) means pivotally connecting said rear end of said auxiliary frame to said main frame for upward and downward pivotal movement of said auxiliary frame relative to said main frame about a transverse pivot axis;
(f) means interconnecting said front end of said auxiliary frame and said main frame for pivoting said auxiliary frame upwardly and downwardly relative to said main frame about said transverse pivot axis;
(g) laterally spaced, independent adjustable means for independently limiting downward movement of opposite sides of said front end of said auxiliary frame relative to said main frame;
(h) laterally spaced, independent adjustable means for independently vertically adjusting opposite sides of said rear end of said main frame relative to said rear wheel means;
(i) rotary surfacing means mounted on said auxiliary frame adjacent said front end thereof and rotatable about a transverse axis of rotation for surfacing pavement over which the machine runs;
(j) engine means mounted on said auxiliary frame;
(k) means providing a driving connection between said engine means and said rotary surfacing means; and
(l) means providing a driving connection between said engine means and at least one of said wheel means.

8. A pavement surfacing machine as defined in claim 7 wherein said auxiliary frame is disposed within said main frame.

9. A pavement surfacing machine as defined in claim 7 including:
(a) laterally spaced indicator means for indicating the vertical positions of said opposite sides of said front end of said auxiliary frame relative to said main frame; and
(b) laterally spaced indicator means for indicating the vertical positions of said opposite sides of said rear end of said main frame relative to said rear wheel means.

10. In a pavement surfacing machine, the combination of:
(a) frame means having longitudinally spaced front and rear ends;
(b) front wheel means connected to and supporting said frame means adjacent said front end thereof;
(c) rear wheel means connected to and supporting said frame means adjacent said rear end thereof;
(d) front rotary surfacing means carried by said frame means between said front and rear wheel means, and rotatable about a front transverse axis of rotation, for surfacing pavement over which the machine runs;
(e) rear rotary surfacing means carried by said frame means between said front rotary surfacing means and said rear wheel means, and rotatable about a rear transverse axis of rotation, for surfacing pavement over which the machine runs;
(f) said front and rear rotary surfacing means respectively having means for cutting different patterns in pavement over which the machine runs;
(g) means connected to said front and rear rotary surfacing means for driving said front and rear rotary surfacing means; and
(h) means connected to at least one of said wheel means for propelling the machine.

References Cited

UNITED STATES PATENTS 3,063,690  11/1962  Cornell _____ 299—39
3,333,897  8/1967  Rhodes _____ 299—39

ERNEST R. PURSER, *Primary Examiner.*